Patented Mar. 19, 1935

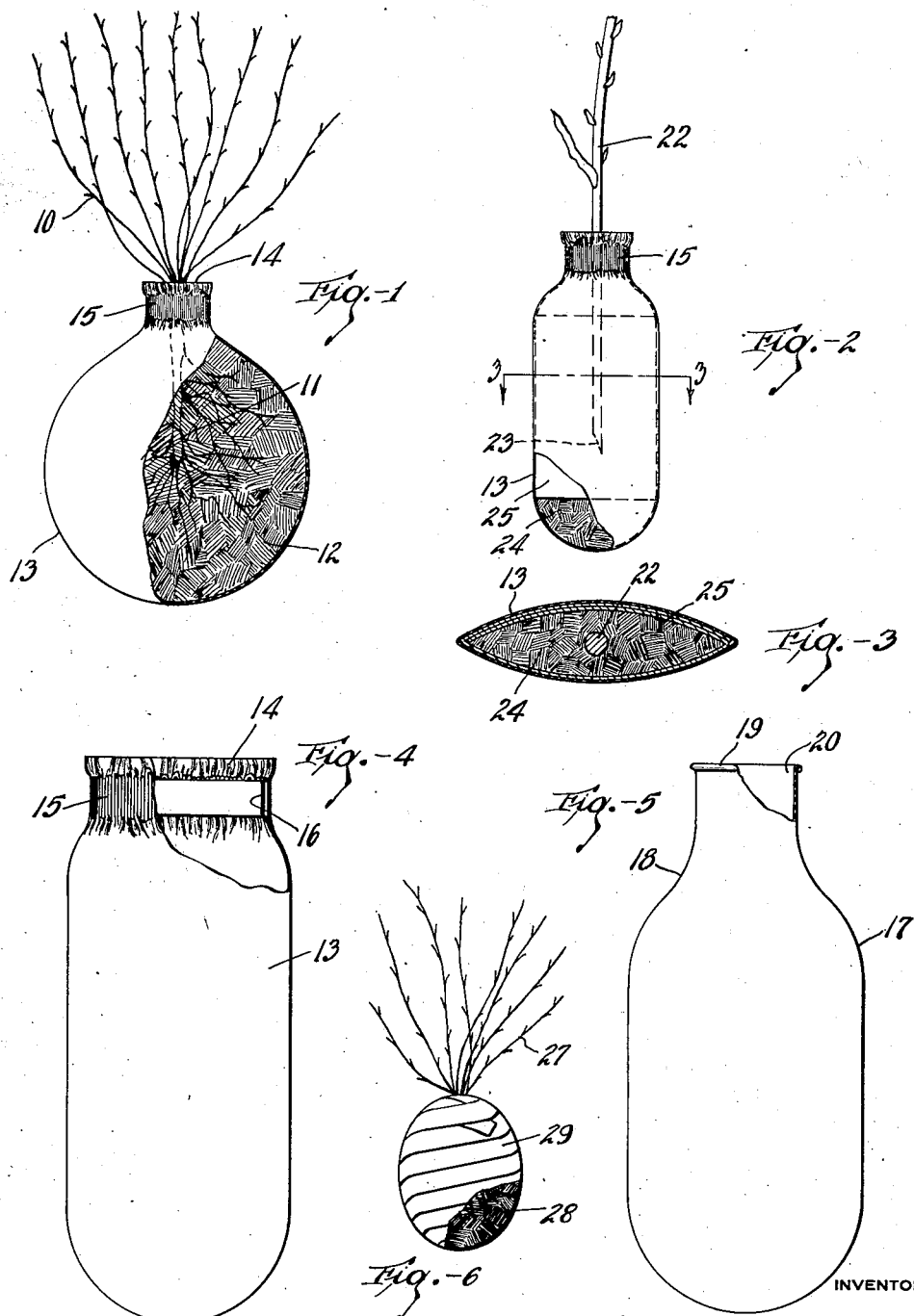

1,994,962

UNITED STATES PATENT OFFICE 1,994,962

PLANT PACKAGE AND METHOD OF MAKING THE SAME

Victor L. Rushfeldt, Albert Lea, Minn.

Application November 12, 1931, Serial No. 574,562

16 Claims. (Cl. 47—37)

This invention relates to plant packages and methods of making the same, and more especially it relates to the packaging of plants, such as nursery stock, for transport, shipment, and sale, and for subsequent transplanting. The invention also contemplates an improved package in which cuttings from plants may be rooted.

In the marketing of nursery stock, the plants are lifted from the ground and their roots are packed in a ball of the soil in which they are grown, or the roots are freed from dirt and packed in a quantity of suitable moisture absorbing material such as moss, peat, shavings, or other suitable material. The ball comprising the plant roots and moisture absorbing material is then enclosed in wrapper to conserve the moisture in the ball, and heretofore such wrappers have comprised water-proof paper, burlap and canvas, and bituminous or asphalt coatings. Such coverings required to be sewed or tied, or required the dipping of the ball in heat plastic material which subsequently hardened and formed a stiff coating on the ball.

The chief objects of this invention are to save time and labor in the packaging of plants for transportation and transplanting; to provide a simplified plant package; to prevent the evaporation of moisture from the roots of plants prepared for transplanting; to provide for the accurate control of moisture about the roots of plants, especially cuttings; to provide a plant package in which the moisture absorbing material is held compactly about the roots of the plant at all times; to prevent bugs and insects from reaching the root-ball of plants that have been lifted for transportation; to provide an improved covering for the root-ball of plants that have been lifted from the soil; and to provide an improved method of packaging plants.

Of the accompanying drawing;

Figure 1 is a side elevation of one embodiment of the invention as it applies to plants prepared for transportation and transplanting, a part being broken away and in section;

Figure 2 is a side elevation showing the application of the invention to plant cuttings prepared for rooting;

Figure 3 is a section on a larger scale on the line 3—3 of Figure 2;

Figure 4 is an elevation of an elastic envelope used for encasing the root-ball of the plant in the improved package, a part being broken away and in section;

Figure 5 is a similar view showing another form of elastic envelope; and

Figure 6 is a side elevation of another embodiment of the invention.

Referring to Figure 1 of the drawing, 10 is a growing plant having roots 11, and 12 is a ball of natural soil, moss, shavings, or other suitable moisture absorbing material about the roots 11 and held in compacted condition thereabout by an elastic envelope 13, preferably of rubber, that encases the moisture absorbing material, the envelope being preferably under tension. The envelope 13 consists of a bag-like structure that has a constricted orifice 14 through which the stem of the plant 10 protrudes, the orifice being sufficiently small so as to preclude the spilling of the material 12 therethrough, but large enough to permit water easily to be poured into the envelope.

The envelope 13 consists of a unitary structure of thin elastic rubber. It may be made by any of the usual methods known to the rubber industry, the envelope shown in detail in Figure 4 being a fabricated structure which probably is most economically manufactured. In the manufacture of the envelope shown in Figures 1 and 4, two sheets of unvulcanized rubber composition are laid face to face, and the envelope, open at one end, is cut therefrom with a die of suitable size and shape, which die seals the structure at the severed margins. Adjacent its open end, the bag-like structure is shirred as shown at 15, and a reinforcing strip of unvulcanized rubber 16 adhesively applied to the shirring to retain it. The structure is then vulcanized in open heat with the result that a unitary elastic structure having a constricted orifice is produced. The envelope shown at 17, Figure 5 is made by coating a suitable form with viscous rubber composition which is subsequently vulcanized. The envelope has a reduced neck 18, and preferably has an integral bead 19 about the orifice 20 of said neck.

In Figure 2 is shown the application of the envelope 13 to plant cuttings, such as the cutting 22. The end of the cutting that is to be rooted usually is obliquely cut as indicated at 23, and is sharp, so that it is desirable to protect the envelope against the possibility of the end 23 being thrust through the moisture absorbing material 24 in which it is embedded and through the envelope. To this end the ball of material 24 is enclosed in a protective covering 25 of relatively stiff material, and the envelope 13 is applied exteriorly thereof, preferably under tension. The protective covering 25 may consist of any suitable stiff material, and it may be pervious or impervious to moisture. Experience has shown that heavy paper or cardboard is suitable for the covering 25, and it may be wrapped around the absorbent material 24, or folded thereabout as shown, the latter form conserving space in packing, and providing a flatter surface on the exterior of the package on which instructions or other printed matter may be better displayed.

In the embodiment of the invention shown in Figure 6, a plant 27 having a root-ball comprising moisture absorbing material 28 has the latter encased and compacted in a covering consisting of a single strip of elastic rubber 29 wrapped thereabout under tension in a plurality of overlapping convolutions. The trailing end of the strip may be secured in place simply by tucking it under one of the adjacent convolutions of the strip. Since the strip 29 is under tension, the overlapping of the convolutions thereof produces a substantially impervious cover about the root ball of the plant. When this type of covering is used on cuttings, it is preferred that a protective wrapper such as that shown at 25 be applied to the material 28 before the strip 29 is wound thereon.

Although but two embodiments of the elastic envelope are shown, it will be obvious that they may be made in any size desired, and in a large variety of shapes within the limits defined. The envelopes are an ideal place for the display of plant names, planting instructions, advertising or other printed matter and obviate the use of tags for this purpose. Their use makes for cleanliness in the handling of the plants since they prevent the leakage of soil or packing material up to the time of planting.

Because of the elasticity of the rubber envelopes, they are applied under tension to the root-balls and thus compact the material about the roots. This prevents air from penetrating the packing material and reaching the roots and thus reduces evaporation of moisture from the packing material. The compacting of the moisture absorbing material about the plant roots in no way impedes the growth of the latter since the envelopes will stretch as the roots increase in size. In its application to cuttings the invention provides a means for retaining moisture whereby exact control of the proper amount of moisture is obtained, either for preserving the cuttings in fresh condition, or for promoting root growth.

The rubber envelopes may be removed from the plants before transplanting, or they may be left on and punctured or slit in a few places, as by a knife. The tension of the rubber will enlarge the aperture thus formed, as will the subsequent growth of the roots, so that the envelope will present no impediment to the growth of the plant when planted with it.

Because of the elastic character of the envelope it is possible, by applying the envelope under tension to the root-ball, to avoid initial compacting of the moisture absorbing material about the roots of the plant, with resulting economy of time and labor.

Various modifications may be resorted to within the spirit of the invention and the scope of the appended claims which are not limited wholly to the specific construction shown or exact procedure described.

What is claimed is:

1. A plant package comprising a plant having a ball of moisture absorbing material about the roots thereof, and an elastic envelope encasing and constantly compacting said material.

2. A plant package comprising a plant having a ball of moisture absorbing material about the roots thereof, and a covering of impervious elastic material under tension surrounding said moisture absorbing material.

3. A plant package comprising a plant having a ball of moisture absorbing material about the roots thereof, and a unitary elastic structure under tension enveloping said material, the stem only of the plant protruding therefrom.

4. A plant package comprising a plant having a ball of moisture absorbing material about the roots thereof, and an impervious envelope consisting of a unitary elastic, rubber structure encasing said material, the envelope being formed with an aperture for the stem of the plant, said envelope being under tension so as to compact the moisture absorbing material.

5. A plant package comprising a plant having a ball of moisture absorbing material about the roots thereof, and an elastic envelope having a constricted orifice encasing and constantly compacting said material, the stem of the plant protruding through said orifice.

6. A plant package comprising a plant having a ball of moisture obsorbing material about the roots thereof, and an elastic rubber envelope having an orifice of reduced size encasing and constantly compacting said material, the stem of the plant protruding through said orifice.

7. A plant package comprising a plant having a ball of moisture absorbing material about the roots thereof, a relatively stiff protective wrapper about said material, and an elastic envelope under tension upon said wrapper.

8. A plant package comprising a plant having a ball of moisture absorbing material about the roots thereof, a cardboard wrapper about said material, and a rubber envelope under tension about said wrapper.

9. A plant package comprising a plant having a ball of moisture absorbing material about the roots thereof, a wrapper of relatively stiff paper about said material and plant roots, and an elastic envelope under tension about said wrapper, said envelope having an orifice of reduced size through which the stem of the plant protrudes.

10. A plant package comprising a plant having a quantity of moisture absorbing material about the roots thereof, and a strip of elastic material wrapped about said moisture absorbing material so as to confine the same.

11. A combination as defined in claim 10 in which the elastic material is wrapped under tension.

12. A plant package comprising a plant having a quantity of moisture absorbing material about the roots thereof, and a wrapper comprising a strip of elastic rubber wrapped about said material under tension in a succession of overlapping convolutions.

13. A plant package comprising a plant having a quantity of moisture absorbing material about the roots thereof, a protective covering of relatively stiff material about said moisture absorbing material, and a strip of elastic impervious material wrapped about the protective covering under tension in a succession of overlapping convolutions.

14. The method of producing a plant package which comprises forming a body of moisture absorbing material about the roots of the plant, and then compacting said moisture absorbing material by applying thereto a confining elastic covering under tension.

15. The method of producing a plant package which comprises forming a body of moisture absorbing material about the roots of the plant, and then compacting said moisture absorbing material by stretching a rubber envelope thereover.

16. The method of producing a plant package which comprises forming a body of moisture absorbing material about the roots of the plant, placing a relatively stiff protective wrapper about the moisture absorbing material, and holding said wrapper securely in place by confining it in an elastic, impervious cover under tension.

VICTOR L. RUSHFELDT.